(12) United States Patent
Yamaguchi et al.

(10) Patent No.: US 6,674,517 B2
(45) Date of Patent: Jan. 6, 2004

(54) OPTICAL MOTION DETECTOR, TRANSPORT SYSTEM AND TRANSPORT PROCESSING SYSTEM

(75) Inventors: Akifumi Yamaguchi, Kashiba (JP); Hisakazu Sugiyama, Nara-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/355,206

(22) Filed: Jan. 31, 2003

(65) Prior Publication Data

US 2003/0142290 A1 Jul. 31, 2003

(30) Foreign Application Priority Data

Jan. 31, 2002 (JP) .......................... 2002-023433

(51) Int. Cl.[7] .............................. G01P 3/36; G01B 11/14
(52) U.S. Cl. .......................................... 356/28; 356/615
(58) Field of Search ..................... 356/28, 615

(56) References Cited

U.S. PATENT DOCUMENTS 3,865,487 A * 2/1975 Andermo ..................... 356/28
6,043,869 A * 3/2000 Uno et al. .................... 356/28

FOREIGN PATENT DOCUMENTS

| JP | 63-131092 | * | 3/1988 |
| JP | 1-172759 | * | 7/1989 |
| JP | 6-34647 A | | 2/1994 |
| JP | 8-292263 A | | 11/1996 |

* cited by examiner

*Primary Examiner*—Stephen C. Buczinski
(74) *Attorney, Agent, or Firm*—Birch, Stewart, Kolasch & Birch, LLP.

(57) ABSTRACT

A light beam from a light-emitting device is applied to a measurement object via a collimator lens and an object lens, and reflected light concentrated via the object lens among the reflected light from a light spot formed on the measurement object is split and concentrated by a beam splitter and a light-receiving lens. The reflected lights from the two regions inside the light spot located at a prescribed interval on a straight line parallel to the travel direction of the measurement object are made to pass separately through two pinholes, respectively, and the resulting reflected lights are respectively made incident on two light-receiving sections. Then, on the basis of the outputs of the two light-receiving sections, the travel speed and the quantity of movement of the measurement object are measured by an operating unit.

11 Claims, 8 Drawing Sheets

OPTICAL MOTION DETECTOR, TRANSPORT SYSTEM AND TRANSPORT PROCESSING SYSTEM

BACKGROUND OF THE INVENTION

The present invention relates to an optical motion detector, transport system, and transport processing system, for detecting a paper feed speed and the quantity of movement of paper in a variety of equipment such as a printer and a copier or measuring in a non-contact manner the speed and the quantity of movement of another object whose surface is not a mirror surface.

Figure 9:
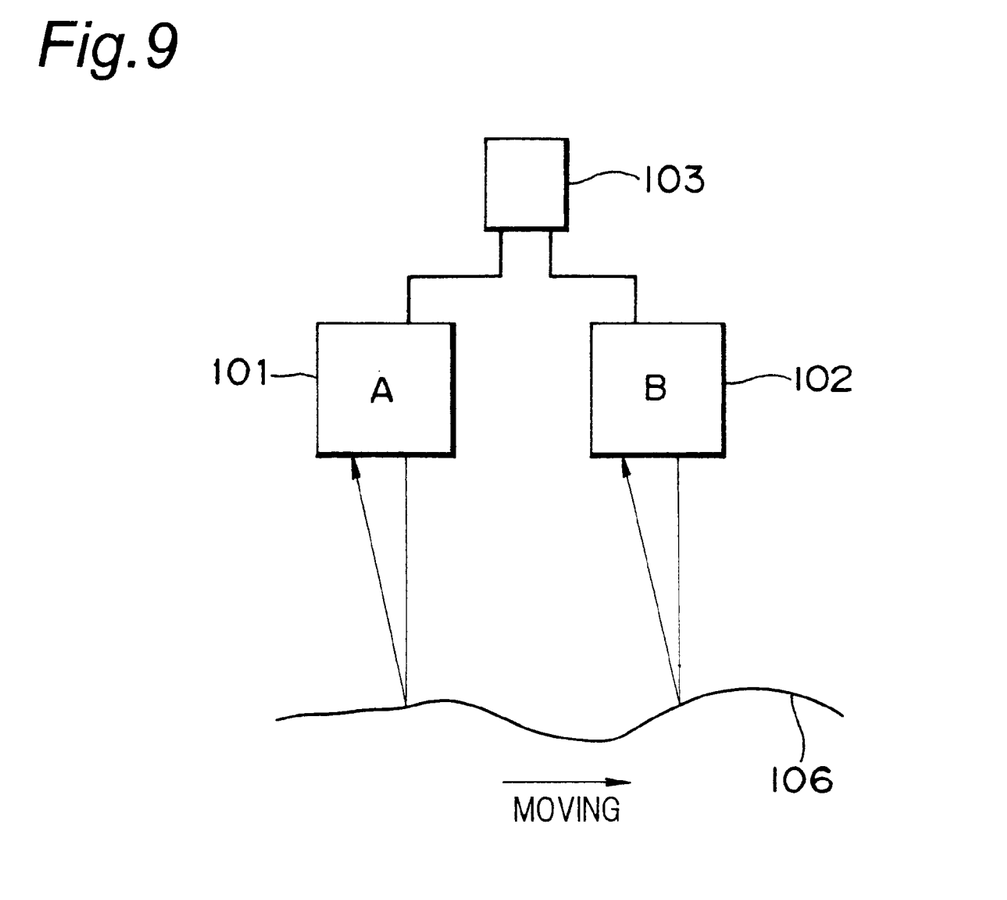
FIG. 9 is a diagram showing the schematic construction of a conventional optical motion detector.
Figure 10:
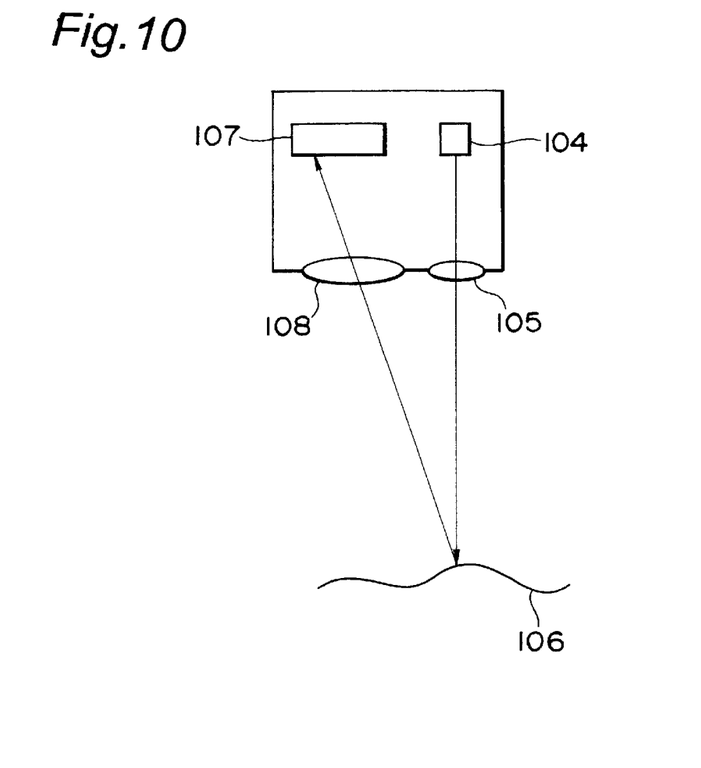
FIG. 10 is a diagram showing the schematic construction of a distance measuring sensor employed in the above optical motion detector.

Conventionally, as shown in FIG. 9, there has been an optical motion detector that has two distance measuring sensors 101 and 102 and a processing unit 103. The principle of the distance measuring sensors 101 and 102 of this optical motion detector will be described with reference to FIG. 10. As shown in FIG. 10, the distance measuring sensors 101 and 102 have a light-emitting section 104, a lens 105 that concentrates diffused light from the light-emitting section 104, a light-receiving section 107 that receives light reflected on a measurement object 106 and a lens 108 that concentrates the reflected light from the measurement object 106 on the light-receiving section 107. In this case, a light beam from the light-emitting section 104 is perpendicularly incident on the measurement object 106, and the reflected light from this position is concentrated on the light-receiving section 107 by the lens 108. The light-receiving section 107 employs a PSD (Position Sensitive Device; position detection device), and a ratio of a first output and a second output varies in correspondence with the position of the spot light concentrated on the light-receiving surface. A distance can be measured by utilizing the phenomenon that the ratio of first output/second output varies in accordance with the distance between this PSD and the measurement object.

Figure 11A:
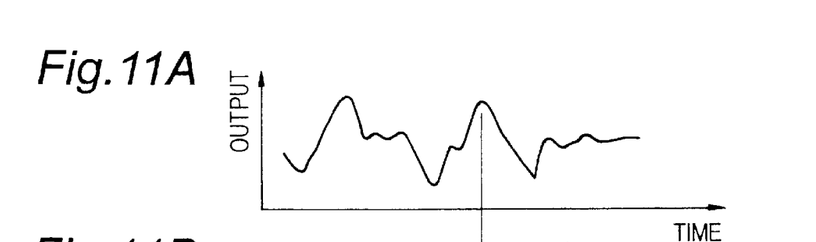
FIG. 11A is a graph showing the output waveform of a distance measuring sensor of A of the above optical motion detector.
Figure 11B:
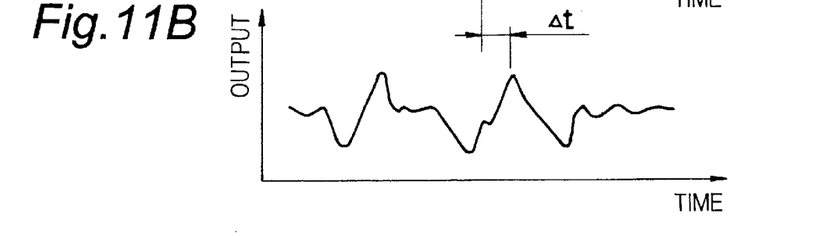
FIG. 11B is a graph showing the output waveform of a distance measuring sensor of B of the above optical motion detector.

In FIG. 9, if the measurement object 106 moves in the direction of arrow, then the two distance measuring sensors 101 and 102 obtain outputs corresponding to the unevenness of the measurement object 6, and these outputs representing the distance between the distance measuring sensors 101 and 102 and the measurement object 106, fluctuate corresponding to the quantity of unevenness. As shown in FIGS. 11A and 11B, with regard to the output waveforms obtained at this time, the distance measuring sensor 102 of B (shown in FIG. 11B) has an output waveform delayed by Δt from that of the distance measuring sensor 101 of A (shown in FIG. 11A) in accordance with the travel speed of the measurement object 6. This delay Δt is calculated by the processing unit 103 to obtain the travel speed and the quantity of movement of the measurement object 106.

The aforementioned optical motion detector, which needs the two distance measuring sensors 101 and 102 that employ the light-emitting section 104, the light-receiving section 107 and the two lenses 105 and 108, has a problem that it has many components and a large size in terms of shape, which leads to high manufacturing cost. Moreover, there is a problem that a measurement object having a comparatively smooth surface (surface having minute unevenness) is hard to measure, dissimilarly to the fortunate case where the measurement object has an uneven surface that can be detected as a difference in distance by the distance measuring sensors 101 and 102.

Furthermore, although there is a laser Doppler type as another conventional optical motion detector, this laser Doppler type optical motion detector is large in size and expensive.

SUMMARY OF THE INVENTION

Accordingly, the object of the present invention is to provide an optical motion detector, transport system and transport processing system capable of reducing the number of components with a simple construction, reducing the size and cost and measuring at least one of the travel speed and the quantity of movement of a measurement object even when the measurement object has a comparatively smooth surface unless the measurement object has a surface of mirror state.

In order to achieve the above object, there is provided an optical motion detector comprising:

a light-emitting device;

a collimator lens for collimating a light beam emitted from the light-emitting device;

an object lens, which concentrates the light beam collimated by the collimator lens and applies the light beam to a measurement object that moves in a prescribed direction, forming a light spot that has a prescribed spot diameter on the measurement object;

a beam splitter, which splits a reflected light which belongs to a reflected light from the light spot of the measurement object and is concentrated via the object lens;

a light-receiving lens, which concentrates the reflected light split by the beam splitter;

two pinholes, through which reflected lights pass, wherein the lights belong to the reflected light concentrated by the light-receiving lens and come from two regions inside the light spot located at a prescribed interval on a straight line parallel to a measurement object travel direction;

two light-receiving sections on which the reflected lights, which have passed through the two pinholes, are respectively made incident; and a measuring section, which measures at least one of a travel speed and a quantity of movement of the measurement object on the basis of outputs of the two light-receiving sections.

According to the optical motion detector of the above-mentioned construction, the light beam emitted from the light-emitting device is collimated by the collimator lens and thereafter applied to a measurement object that moves in the prescribed direction via the object lens, forming a light spot on the measurement object. Among the reflected light from this light spot, the reflected light concentrated via the object lens is split by the beam splitter and concentrated by the light-receiving lens. Thereafter, only the reflected light from the two regions located at the prescribed interval on the straight line parallel to the measurement object travel direction inside the light spot is made to pass separately through the two pinholes, and the reflected light that has passed through the two pinholes is made incident on two light-receiving sections. Then, on the basis of the outputs of the two light-receiving sections, at least one of the travel speed and the quantity of movement of the measurement object is measured by the measuring section. That is, when the measurement object moves, one output waveform of the output waveforms detected by the two light-receiving sections has a shape delayed timewise from the other output waveform. By preparatorily setting a distance between the two regions inside the light spot, the travel speed or the quantity of movement of the measurement object can be obtained on the basis of the time of delay of the output waveform of this light-receiving section and the distance between the two regions inside the light spot. Therefore, the number of components of the motion detector can be reduced with a simple construction, and this allows a size reduction in terms of shape and a reduction in manufacturing cost to be achieved. Moreover, even a measurement object that has a comparatively smooth surface can be measured unless the surface state (state of unevenness) of the measurement object is a mirror surface.

In one embodiment of the present invention, the light-emitting device is a semiconductor laser device.

According to the optical motion detector of the above-mentioned embodiment, which employs the light-emitting device of a semiconductor laser that has a small light-emitting section and is tantamount to a point light source, is therefore able to efficiently concentrate light by the lens and obtain a quantity of reflected light required for the signal detection by the light-receiving device from the measurement object.

In one embodiment of the present invention, an optical axis of emitted light concentrated by the object lens is perpendicular to the measurement object.

According to the optical motion detector of the above-mentioned embodiment, the optical axis of the emitted light, which is concentrated by the object lens and applied to the measurement object moving in the prescribed direction, is approximately perpendicular to the measurement object. Therefore, the depth of focus becomes deep, and even if the interval between the measurement object and the object lens is varied due to the positional variation of the measurement object, the variation in the shape of the light spot on the measurement object can be reduced further than when the light beam is not applied perpendicularly to the measurement object.

In one embodiment of the present invention, the measurement object is located in a position farther apart from the object lens than a focal position of the emitted light concentrated by the object lens.

According to the optical motion detector of the above-mentioned embodiment, the measurement object is located in a position farther apart from the object lens than the focal position in which the light beam is concentrated by the object lens. Therefore, the optical system, which is able to secure the two regions located at the prescribed interval on the measurement object and concentrate the reflected light from these two regions by the object lens, can be formed.

In one embodiment of the present invention, the two light-receiving sections are provided in one light-receiving device, and
  the two pinholes are formed in a mask provided on light-receiving surfaces of the two light-receiving sections.

According to the optical motion detector of the above-mentioned embodiment, the mask is provided on the light-receiving surfaces of the two light-receiving sections provided for the one light-receiving device, and the two pinholes are formed in the positions of the mask corresponding to the two light-receiving sections of the light-receiving device. Since the two pinholes and the light-receiving device (having the two light-receiving sections) are integrated with each other, pinholes of high accuracies of size and position can be achieved, and this allows the achievement of cost reduction than when the pinholes are provided in separate members.

In one embodiment of the present invention, a size A of the two regions located at the prescribed interval on the straight line parallel to the measurement object travel direction inside the light spot has a diameter of not smaller than 10 $\mu$m and not greater than 100 $\mu$m, and
a size of the two pinholes is a size obtained by the size A of the two regions and an optical image formation formula.

According to the optical motion detector of the above-mentioned embodiment, the size A of the two regions inside the light spot is not smaller than 10 $\mu$m and not greater than 100 $\mu$m, and the size of the two pinholes is obtained by the above-mentioned size A and the optical image formation formula. Therefore, a signal of sufficient absolute quantity and signal-to-noise ratio can be obtained, and the change in the surface state of the measurement object can reliably be detected. In this case, assuming that a distance from an object to the lens is L1 and a distance from the lens to the image is L2 when the object forms an image on the opposite side via the lens, then the optical image formation formula expresses the relation that the magnification (ratio of the image size to the object size) is L2/L1.

In one embodiment of the present invention, an interval B between centers of the two regions located at the prescribed interval on the straight line parallel to the measurement object travel direction inside the light spot satisfies the condition of:

$$A \leq B \leq S \cdot A/\tan\theta$$

(where S is a ratio of a quantity of relative displacement of the two regions inside the light spot in a perpendicular direction to the measurement object travel direction within a plane thereof with respect to A, $\theta$ is an angle made between the measurement object travel direction and a prescribed travel direction, and 0.4>S>tan $\theta$).

According to the optical motion detector of the above-mentioned embodiment, assuming that the ratio of the quantity of relative displacement of the two regions inside the light spot in the perpendicular direction to the measurement object travel direction within the plane thereof with respect to A is S, an angle made between the measurement object travel direction and a prescribed travel direction is $\theta$ and 0.4>S>tan $\theta$ when the region of the size A is displaced on the measurement object, then an interval B between the centers of the two regions ranges from A to S·A/tan $\theta$. Accordingly, there can be achieved the detection of the measurement object with a small error against displacement of the actual travel direction with respect to the prescribed travel direction.

In one embodiment of the present invention, the two pinholes have an oval shape or a rectangular shape whose longitudinal direction is approximately perpendicular to the measurement object travel direction.

According to the optical motion detector of the above-mentioned embodiment, the displacement of the actual measurement object travel direction with respect to the prescribed travel direction becomes a displacement in a direction approximately perpendicular to the prescribed travel direction of the measurement object. By making the two pinholes have the oval shape or the rectangular shape of which the longitudinal direction is approximately perpendicular to the measurement object travel direction instead of a round shape, the error of the information of the surface state of the measurement object is reduced, and the detection can be achieved with a small error with respect to the displacement.

In one embodiment of the present invention, the optical motion detector is provided with a casing for guiding the measurement object.

According to the optical motion detector of the above-mentioned embodiment, the casing that guides the measurement object so that the measurement object is located in the position the prescribed distance apart from the object lens. Therefore, the variation in the distance between the measurement object and the object lens can be reduced, and this allows the reduction in the variations of the size A of the two regions and the interval B between the centers thereof inside the light spot and allows accurate detection to be achieved.

In one embodiment of the present invention, when the measurement object is transported by a transport unit, the speed of the measurement object is controlled by the transport unit on the basis of a signal that represents at least one of the travel speed and the quantity of movement of the measurement object measured by the optical motion detector.

According to the transport system of the above-mentioned construction, by feeding back at least one of the travel speed and the quantity of movement of the measurement object measured by the aforementioned optical motion detector to the transport system, there can be provided the transport system that accurately controls at least one of the travel speed and the quantity of movement of the measurement object.

In one embodiment of the present invention, when the measurement object is subjected to processing by a processing unit while the measurement object is transported, the processing of the measurement object is performed in a prescribed position by the processing unit on the basis of a signal that represents at least one of the travel speed and the quantity of movement of the measurement object measured by the optical motion detector.

According to the transport processing system of the above-mentioned construction, when the measurement object is subjected to some processing while the measurement object is transported, at least one of the travel speed and the quantity of movement of the measurement object measured by the optical motion detector is fed back to the processing unit to control the timing of the processing. Therefore, a transport processing system, which can accurately perform the processing of the measurement object in the prescribed position, can be achieved.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The optical motion detector, transport system and transport processing system of this invention will be described in detail below on the basis of the embodiments shown in the drawings.

Figure 1:
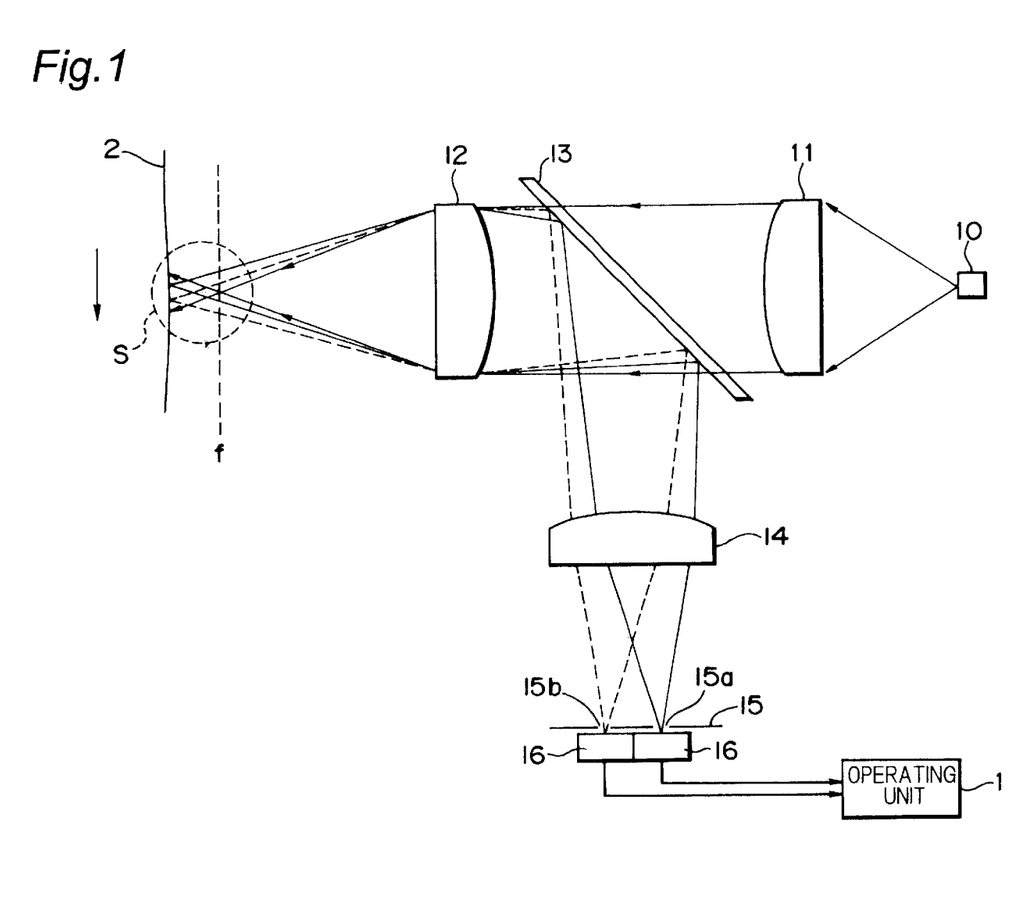
FIG. 1 is a diagram showing the schematic construction of an optical motion detector according to one embodiment of this invention.

FIG. 1 is a diagram showing the schematic construction of the optical motion detector of one embodiment of this invention, which includes a light-emitting device 10, a collimator lens 11, an object lens 12, a beam splitter 13, a light-receiving lens 14, a mask 15 provided with pinholes 15a and 15b and light-receiving devices 16 and 16. There is further provided an operating unit 1 that serves as a measuring section for measuring the travel speed of a measurement object 2 upon receiving signals from the light-receiving devices 16 and 16.

As shown in FIG. 1, the optical motion detector of this invention collimates (making a thoroughly parallel beam of) the light beam emitted from the light-emitting device 10 (preferably, a semiconductor laser) by means of the collimator lens 11 and thereafter applies the resulting light beam to the measurement object 2 so that the optical axis becomes perpendicular to the measurement object 2 via the object lens 12, forming a light spot on the measurement object 2 that is moving in a prescribed direction. At this time, the measurement object 2 is located in a position farther apart from the object lens 12 than a focal position f in which the light beam is concentrated by the object lens 12. The light beam is applied to the measurement object 2 so that the optical axis becomes perpendicular to the measurement object 2, and therefore, the focal depth becomes deep. Therefore, even if an interval between the measurement object 2 and the object lens 12 is varied by the positional variation of the measurement object 2, the variation in the shape of the light spot on the measurement object 2 can be reduced further than when the light beam is not applied perpendicularly to the measurement object 2.

Figure 2:
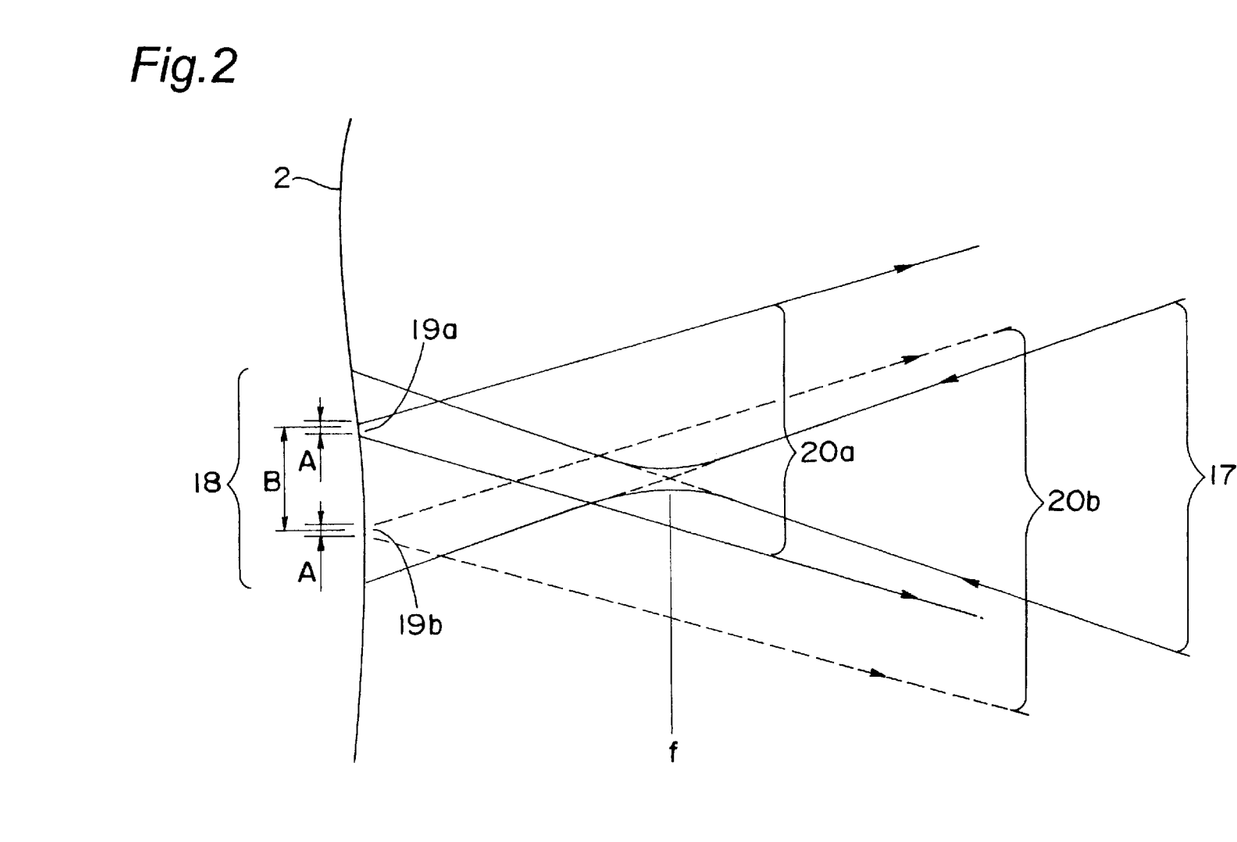
FIG. 2 is an enlarged view of a light-concentrating portion formed by an object lens of the above optical motion detector.

FIG. 2 shows an enlarged view of the light-concentrating portion S of FIG. 1. As shown in FIG. 2, a light beam 17 concentrated by the object lens 12 (shown in FIG. 1) comes to have a minimum beam diameter in the focal position f and thereafter expands to form a light spot 18 on the measurement object 2. Next, the reflected light from this light spot 18 travels in all directions. After passing through the object lens 12, the reflected light is split in prescribed directions by the beam splitter 13 (shown in FIG. 1). Further, the reflected light split by the beam splitter 13 passes through the light-receiving lens 14 (shown in FIG. 1), passes through the two pinholes 15a and 15b (shown in FIG. 1) of the mask 15 and made incident on the two light-receiving devices 16 and 16 (shown in FIG. 1).

The light beams incident on the two light-receiving devices 16 and 16 (shown in FIG. 1) are only the beams of reflected light 20a and 20b that are reflected on two regions 19a and 19b located at a prescribed interval on a straight line parallel to the measurement object travel direction on the measurement object 2 and pass through the object lens 12. Conversely speaking, by determining the prescribed contents of the optical system including the pinholes 15a and 15b, the light beams incident on the two light-receiving devices 16 and 16 (shown in FIG. 1) can only be the light beams reflected on the two regions 19a and 19b located on the measurement object 2.

That is, the beams of reflected light 20a and 20b, which belong to the light beams reflected on the two regions 19a and 19b located on the measurement object 2 and are concentrated via the object lens 12 (shown in FIG. 1), are split by the beam splitter 13 (shown in FIG. 1), concentrated by the light-receiving lens 14 (shown in FIG. 1), thereafter made to separately pass through the two pinholes 15a and 15b (shown in FIG. 1) and made incident on the two light-receiving devices 16 and 16.

In this case, the two regions inside the light spot on the measurement object 2 have a size A of a diameter of not smaller than about 10 μm and not greater than 100 μm, and the two pinholes 15a and 15b have a size obtained by the size A of the two regions 19a and 19b and an optical image formation formula. If the size A of the two regions is smaller than 10 μm, then the quantity of light incident on the light-receiving devices is reduced, and a satisfactory output cannot be obtained. Moreover, if the size A of the two regions is greater than 100 μm, then a signal obtained by averaging the surface state of the measurement object is to be received. Therefore, the signal disadvantageously comes to have a degraded signal-to-noise ratio although the absolute quantity is large.

Figure 3:
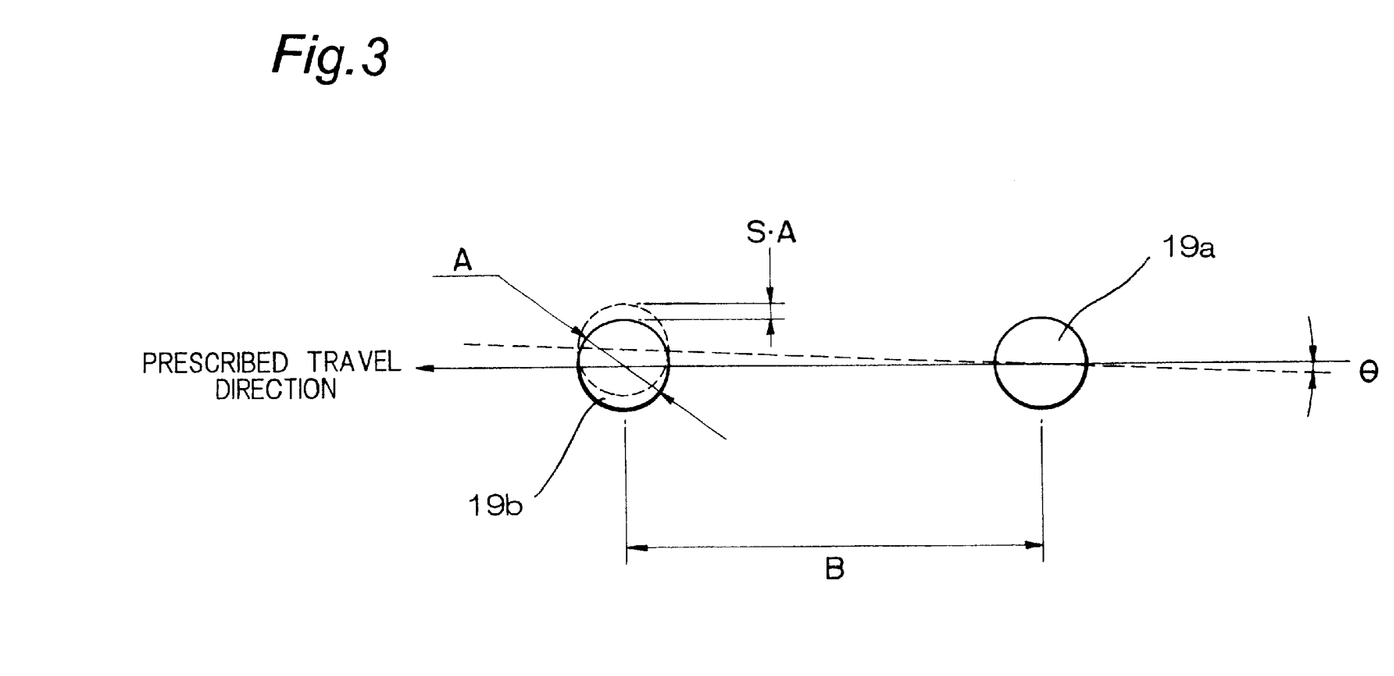
FIG. 3 is a diagram showing two regions on a measurement object measured by the above optical motion detector.

An interval B between the centers of the two regions 19a and 19b shown in FIG. 3 is:

$$A \leq B \leq S \cdot A / \tan \theta$$

(where S is the ratio of the quantity of relative displacement of the two regions inside the light spot in the perpendicular direction to the measurement object travel direction within the plane thereof with respect to A, θ is an angle made between the measurement object travel direction and a prescribed travel direction, and $0.4 > S > \tan \theta$). The smaller the interval B between the centers of the two regions 19a and 19b on the measurement object 2 is, the greater the tolerance results in the measurement object travel direction (direction of the dashed line in FIG. 3) with respect to the prescribed travel direction (direction of the solid line in FIG. 3). However, the size B cannot be made smaller than the size A of the two regions 19a and 19b. It is to be noted that the light incident on the light-receiving side is the light of only the overlap region of the two regions 19a and 19b and their displaced regions inside the light spot on the measurement object 2. Therefore, if S becomes equal to or greater than 0.4, then the overlap region of the two regular regions 19a and 19b and their displaced regions inside the light spot on the measurement object 2 becomes half or less, and the quantity of light on the light-receiving side becomes insufficient.

Figure 4A:
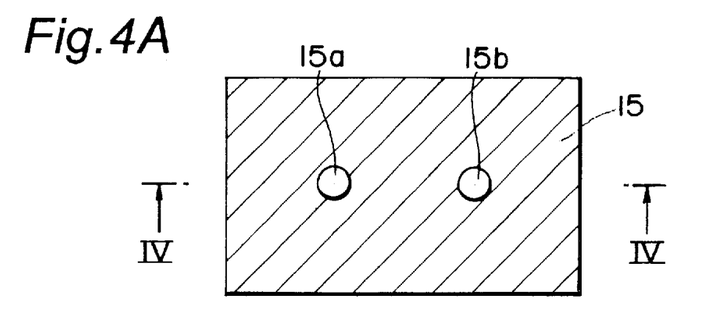
FIG. 4A is a plan view of a light-receiving device in which two pinholes are integrated with a light-receiving device (whose light-receiving surface is divided into two)
Figure 4B:
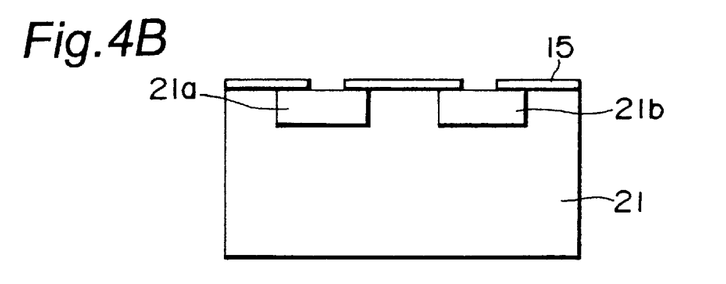
FIG. 4B is a sectional view viewed from the line IV—IV of FIG. 4A.

The two light-receiving devices 16 and 16 are employed in FIG. 1. However, as shown in FIGS. 4A and 4B, the two pinholes 15a and 15b should preferably have a structure in which the mask 15 having the two pinholes 15a and 15b on bisected light-receiving sections 21a and 21b of one light-receiving device 21 is provided and the two pinholes 15a and 15b and the light-receiving device 21 (having two light-receiving sections 21a and 21b) are integrated with each other. This mask 15 can be provided by, for example, an Al mask in a semiconductor process for fabricating the light-receiving device 21. If the mask can be thus fabricated during the semiconductor process, then submicron-order accuracy can be achieved in terms of the size and positions of the pinholes.

Figure 5A:
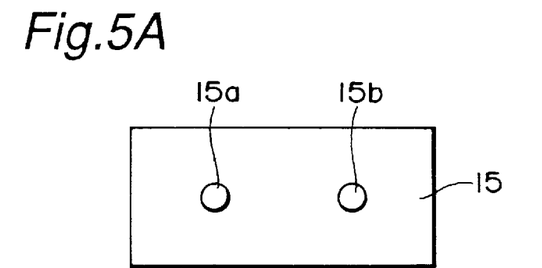
FIG. 5A is a view showing pinholes of a round shape.
Figure 5B:
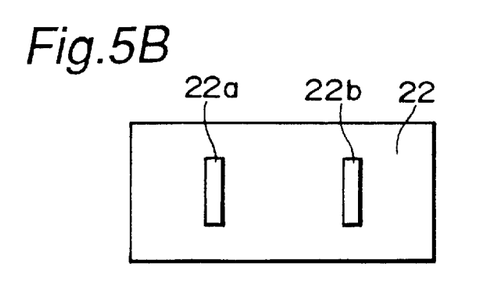
FIG. 5B is a view showing pinholes of a rectangular shape.
Figure 5C:
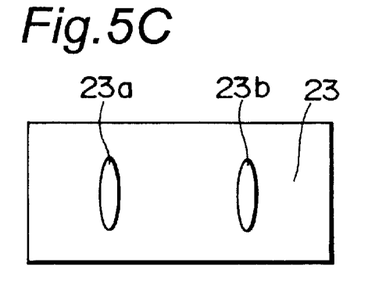
FIG. 5C is a diagram showing pinholes of an oval shape.

Further, the shape of the two pinholes should preferably be the rectangular pinholes 22a and 22b formed through the mask 22 shown in FIG. 5B or the oval pinholes 23a and 23b formed in the mask 23 shown in FIG. 5C instead of the round pinholes 15a and 15b formed in the mask 15 shown in FIG. 5A. With the rectangular or oval pinholes, a signal change (change in the amount of information of the surface state of the measurement object) is reduced in comparison with the case of the round shape even if the measurement object travel direction is displaced to some degree relative to the prescribed travel direction, and therefore, the tolerance with respect to the displacement is increased.

Figures 6A, 6B:
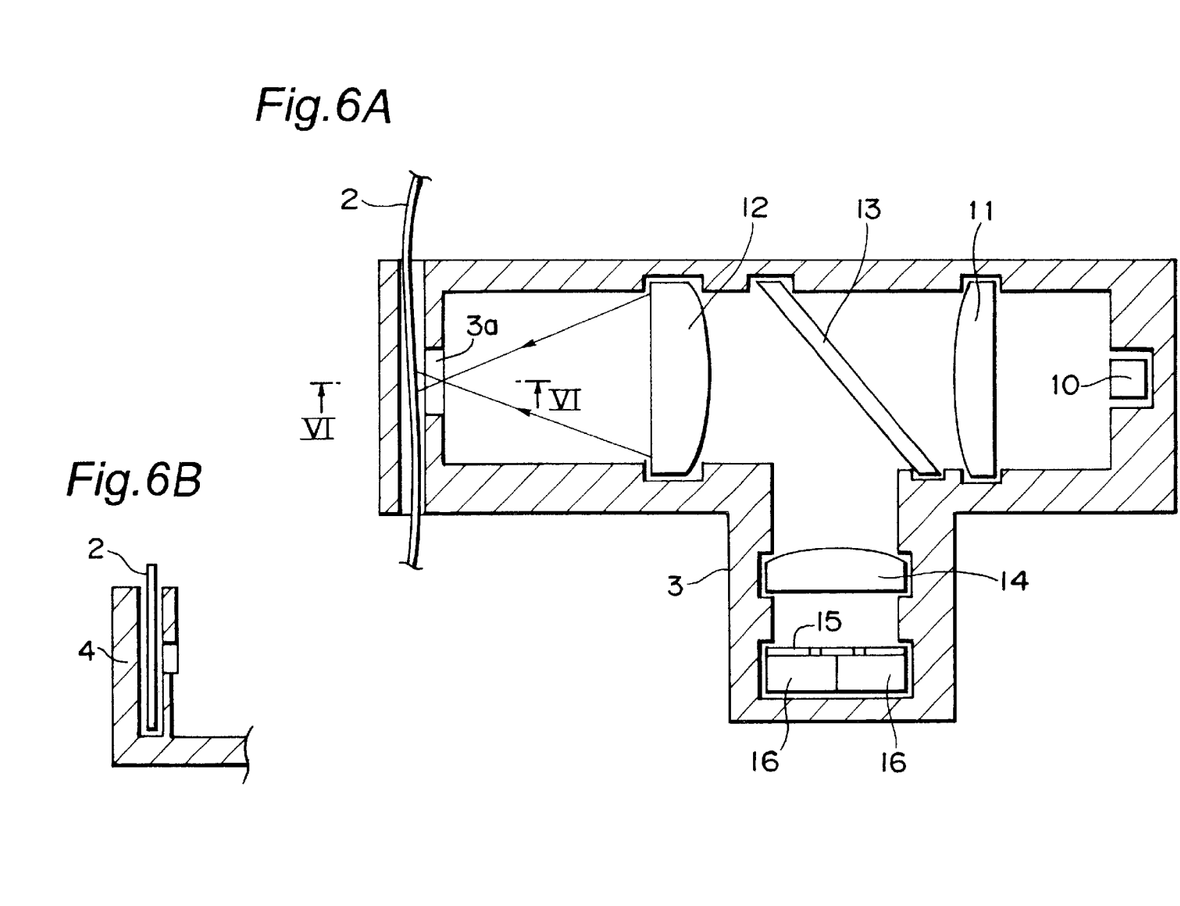
FIG. 6A is a sectional view showing the essential part of the above optical motion detector.
FIG. 6B is a sectional view of a guide portion for guiding a measurement object viewed from the line VI—VI of FIG. 6A.

FIG. 6A is a sectional view showing the construction of an optical motion detector provided with a casing 3 that retains these optical components with a prescribed positional relation. The same components as those of the optical motion detector shown in FIG. 1 are denoted by the same reference numerals, and no description is provided therefor. Moreover, this casing 3 has a guide 4 (shown in FIG. 6B) for guiding the measurement object 2 so that the measurement object 2 is located at a prescribed distance from the object lens 12, and a window 3a-is formed on the object lens 12 side of the guide 4. With this guide 4, the variation of the size A and the interval B between the centers of the two regions 19a and 19b (shown in FIG. 2) inside the light spot on the measurement object 2 can be reduced, allowing the detection to be accurately achieved.

According to the optical motion detector of the aforementioned construction, if the measurement object 2 moves, then the signals detected by the two light-receiving devices 16 and 16 come to have waveforms such that one waveform is delayed timewise from the other waveform. The interval B between the centers of the two regions 19a and 19b (shown in FIG. 2) on the measurement object 2 is already known. Therefore, if this time of delay is obtained by performing electric circuit processing by the operating unit 1 (shown in FIG. 1), then the travel speed and the quantity of movement of the measurement object 2 can be measured.

Figure 7:
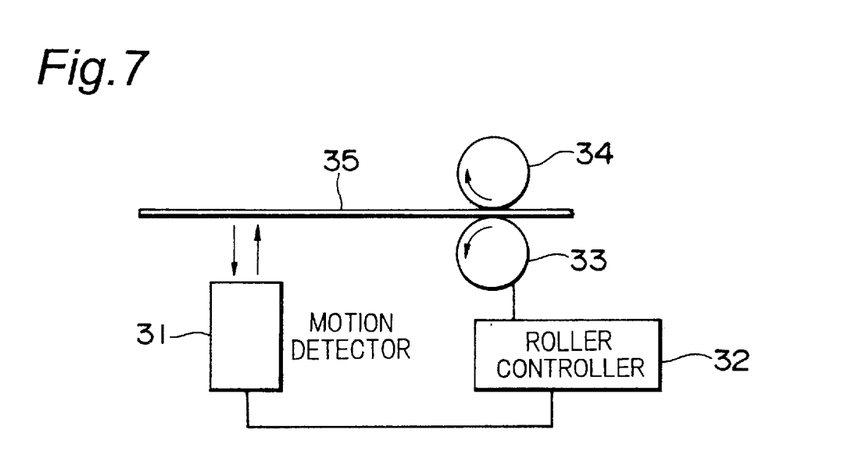
FIG. 7 is a schematic view of a transport system that keeps the speed of the measurement object constant by means of the optical motion detector of this invention.

Moreover, as shown in FIG. 7, by feeding back the travel speed and the quantity of movement of a measurement object 35 measured by the optical motion detector (31 in FIG. 7) of the aforementioned embodiment to a transport system (a roller controller 32) and controlling the rotating speed of rollers 33 and 34, there can be provided a transport system that is able to keep the speed of the measurement object 35 constant and accurately perform speed control. The roller controller 32 and the rollers 33 and 34 constitute a transport unit. The optical motion detector 31 may measure either one of the travel speed and the quantity of movement of the measurement object 35 and feed back the same to the transport system.

Figure 8:
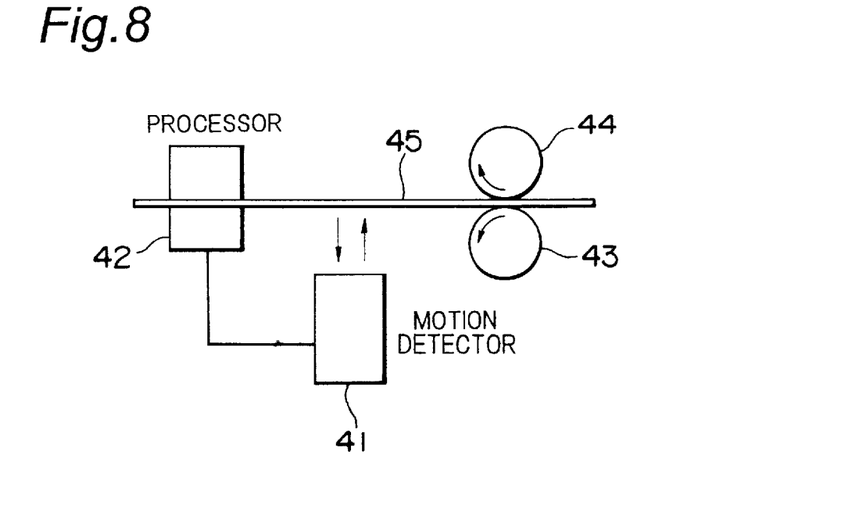
FIG. 8 is a schematic view of a transport processing system that can perform the processing of the measurement object in a prescribed position by means of the optical motion detector of this invention.

Further, as shown in FIG. 8, when a measurement object 45 is subjected to some processing by a processing unit 42 while transporting the object by the rollers 43 and 44, it is enables to achieve a transport processing system that can accurately perform the processing of the measurement object 45 in a prescribed position by feeding back the speed of the measurement object 45 measured by the optical motion detector (41 in FIG. 8) of the aforementioned embodiment to the processing unit 42 for the control of the timing of the processing by the processing unit 42. The optical motion detector 41 may measure either one of the travel speed and the quantity of movement of the measurement object 45 and feed back the same to the processing unit 42.

According to the optical motion detector of this invention, the paper feed speed and the quantity of movement of paper can be detected by applying the detector to a printer or a copier. However, this invention is limited to neither the printer nor the copier, and the optical motion detector of this invention can be applied to a variety of fields where the speed and the quantity of movement of an object whose surface is not the mirror surface is measured in a non-contact manner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical motion detector comprising:
   a light-emitting device;
   a collimator lens for collimating a light beam emitted from the light-emitting device;
   an object lens, which concentrates the light beam collimated by the collimator lens and applies the light beam to a measurement object that moves in a prescribed direction, forming a light spot that has a prescribed spot diameter on the measurement object;
   a beam splitter, which splits a reflected light which belongs to a reflected light from the light spot of the measurement object and is concentrated via the object lens;
   a light-receiving lens, which concentrates the reflected light split by the beam splitter;
   two pinholes, through which reflected lights pass, wherein the lights belong to the reflected light concentrated by the light-receiving lens and come from two regions inside the light spot located at a prescribed interval on a straight line parallel to a measurement object travel direction;
   two light-receiving sections on which the reflected lights, which have passed through the two pinholes, are respectively made incident; and
   a measuring section, which measures at least one of a travel speed and a quantity of movement of the measurement object on the basis of outputs of the two light-receiving sections.

2. The optical motion detector as claimed in claim 1, wherein
   the light-emitting device is a semiconductor laser device.

3. The optical motion detector as claimed in claim 1, wherein
   an optical axis of emitted light concentrated by the object lens is perpendicular to the measurement object.

4. The optical motion detector as claimed in claim 1, wherein
   the measurement object is located in a position farther apart from the object lens than a focal position of the emitted light concentrated by the object lens.

5. The optical motion detector as claimed in claim 1, wherein
   the two light-receiving sections are provided in one light-receiving device, and
   the two pinholes are formed in a mask provided on light-receiving surfaces of the two light-receiving sections.

6. The optical motion detector as claimed in claim 1, wherein
   a size A of the two regions located at the prescribed interval on the straight line parallel to the measurement object travel direction inside the light spot has a diameter of not smaller than 10 $\mu$m and not greater than 100 $\mu$m, and
   a size of the two pinholes is a size obtained by the size A of the two regions and an optical image formation formula.

7. The optical motion detector as claimed in claim 1, wherein
   an interval B between centers of the two regions located at the prescribed interval on the straight line parallel to the measurement object travel direction inside the light spot satisfies the condition of:

$$A \leq B \leq S \cdot A/\tan \theta$$

(where S is a ratio of a quantity of relative displacement of the two regions inside the light spot in a perpendicular direction to the measurement object travel direction within a plane thereof with respect to A, $\theta$ is an angle made between the measurement object travel direction and a prescribed travel direction, and $0.4 > S > \tan \theta$).

8. The optical motion detector as claimed in claim 1, wherein
   the two pinholes have an oval shape or a rectangular shape whose longitudinal direction is approximately perpendicular to the measurement object travel direction.

9. The optical motion detector as claimed in claim 1, provided with:
   a casing for guiding the measurement object.

10. A transport system employing the optical motion detector claimed in claim 1, wherein
    when the measurement object is transported by a transport unit, the speed of the measurement object is controlled by the transport unit on the basis of a signal that represents at least one of the travel speed and the quantity of movement of the measurement object measured by the optical motion detector.

11. A transport processing system employing the optical motion detector claimed in claim 1, wherein
    when the measurement object is subjected to processing by a processing unit while the measurement object is transported, the processing of the measurement object is performed in a prescribed position by the processing unit on the basis of a signal that represents at least one of the travel speed and the quantity of movement of the measurement object measured by the optical motion detector.

* * * * *